US009537894B1

(12) United States Patent
Kuscher et al.

(10) Patent No.: US 9,537,894 B1
(45) Date of Patent: Jan. 3, 2017

(54) EPHEMERAL USER ACCOUNT SYSTEM

(71) Applicant: Google Inc., Mountain View, CA (US)

(72) Inventors: Alexander Friedrich Kuscher, San Francisco, CA (US); Min Li Chan, San Francisco, CA (US); Sumit Gwalani, Mountain View, CA (US)

(73) Assignee: Google Inc., Mountain View, CA (US)

( * ) Notice: Subject to any disclaimer, the term of this patent is extended or adjusted under 35 U.S.C. 154(b) by 76 days.

(21) Appl. No.: 14/487,007

(22) Filed: Sep. 15, 2014

Related U.S. Application Data

(60) Provisional application No. 62/007,845, filed on Jun. 4, 2014.

(51) Int. Cl.
*H04L 29/06* (2006.01)
*G06F 17/30* (2006.01)

(52) U.S. Cl.
CPC ......... *H04L 63/20* (2013.01); *G06F 17/30117* (2013.01); *H04L 63/08* (2013.01)

(58) Field of Classification Search
None
See application file for complete search history.

(56) References Cited

U.S. PATENT DOCUMENTS

| | | | | |
|---|---|---|---|---|
| 7,747,759 | B1 * | 6/2010 | Skura | G06F 17/30905 709/217 |
| 2002/0026436 | A1 * | 2/2002 | Joory | G06F 17/30575 |
| 2007/0111726 | A1 | 5/2007 | Lambert et al. | |
| 2007/0255838 | A1 | 11/2007 | Hassan et al. | |
| 2010/0111270 | A1 * | 5/2010 | Langos | H04M 3/533 379/88.14 |
| 2010/0302242 | A1 * | 12/2010 | Buchanan | G06F 17/50 345/420 |
| 2012/0066673 | A1 * | 3/2012 | Miller, III | H04L 41/082 717/171 |

(Continued)

OTHER PUBLICATIONS

Kevin Remde, Guest OS Profiles in System Center 2012 SP1 VMM: Build Your Private Cloud (Series); http://blogs.technet.com/b/kevinremde/archive/2013/04/23/guest-os-profiles-in-system-center-2012-sp1-vmm-build-your-private-cloud-series.aspx, Apr. 23, 2013.

(Continued)

*Primary Examiner* — Dede Zecher
*Assistant Examiner* — Richard McCoy
(74) *Attorney, Agent, or Firm* — McDermott Will & Emery LLP (57) ABSTRACT

A non-transitory machine-readable medium embodying instructions that, when executed by a machine, allow the machine to perform a method are provided. In one aspect, a method includes receiving, at a computing device, user account credentials associated with an online user account. The method includes sending the user account credentials to a server. The method includes receiving, in response to sending the user account credentials to a server, a user profile associated with the user account. The method includes configuring an operating system session on the device based on the user profile. The method includes receiving an indication to terminate the operating system session. The method includes, erasing, upon termination of the operating system session, the received user profile and data stored locally on the computing device during the operating system session. Systems and methods are also provided.

21 Claims, 5 Drawing Sheets

(56) References Cited

U.S. PATENT DOCUMENTS

2015/0236915 A1* 8/2015 Mohammed ............ H04L 67/30
709/223

OTHER PUBLICATIONS http://support.apple.com/kb/ph6419; Mac OS X 10.6; Creating a guest user account, Aug. 6, 2013.
http://technet.microsoft.com/en-us/library/hh427296.aspx; How to Create a Guest Operating System Profile, Nov. 1, 2013.
http://support.citrix.com/article/CTX134477; How to Import an OS Profile Definition in XenClient Enterprise, Aug. 8, 2012.

* cited by examiner

EPHEMERAL USER ACCOUNT SYSTEM

CROSS-REFERENCE TO RELATED APPLICATION

This application claims priority to U.S. Provisional Patent Application No. 62/007,845, filed on Jun. 4, 2014, entitled "EPHEMERAL USER ACCOUNT SYSTEM," the entire contents of which are herein incorporated by reference in its entirety.

BACKGROUND

The present disclosure generally relates to providing stored settings for a user of an operating system.

When a user of a computer turns the computer on, the user may be prompted to select a profile associated with the user and may be prompted to provide a password in order to verify the user is allowed access to use of the profile. An operating system session may be configured according to settings associated with the profile. In this way, a consistent environment is presented to the user each time the user uses the computer under the profile. Multiple profiles may be available so that more than one user may have access to a consistent environment from session to session. If the user does not have a profile stored on the computer, the user may choose a guest mode where the environment presented to the user is configured according to default settings independent of the user's preferences.

SUMMARY

According to one embodiment of the present disclosure, a non-transitory machine-readable medium embodying instructions is provided. These instructions, when executed by a machine, allow the machine to perform a method. The method includes receiving, at a computing device, user account credentials associated with an online user account. The method includes sending the user account credentials to a server. The method includes receiving, in response to sending the user account credentials to a server, a user profile associated with the user account. The method includes configuring an operating system session on the device based on the user profile. The method includes receiving an indication to terminate the operating system session. The method includes erasing, upon termination of the operating system session, the received user profile and data stored locally on the computing device during the operating system session.

According to one embodiment of the present disclosure, a system is provided. The system includes a memory storing executable instructions and a processor configured to execute the executable instructions stored in the memory to receive, at a computing device, user account credentials associated with an online user account. The processor is further configured to send the user account credentials to a server. The processor is further configured to receive, in response to sending the user account credentials to a server, a user operating system profile associated with the user account, wherein the user operating system profile comprises user settings and files associated with an operating system. The processor is further configured to configure an operating system session on the device based on the user profile. The processor is further configured to receive an indication to terminate the operating system session. The processor is further configured to erase, upon termination of the operating system session, the received user profile and data stored locally on the computing device during the operating system session.

According to one embodiment of the present disclosure, a computer-implemented method for an ephemeral user account system is provided. The method includes receiving, at a computing device, via a device login interface, user account credentials associated with an online user account. The method includes sending the user account credentials to a remote server. The method includes receiving, in response to sending the user account credentials to a server, a user profile associated with the user account. The method includes configuring an operating system session on the device based on the user profile. The method includes receiving an indication to terminate the operating system session. The method includes, if an indication to save the received user profile is not received, erasing, upon termination of the operating system session, the received user profile and data stored locally on the computing device during the operating system session.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that embodiments of the present disclosure may be practiced without some of these specific details. In other instances, well-known structures and techniques have not been shown in detail so as not to obscure the disclosure.

If a laptop or computer owner would like to share his/her device with a guest user, the guest user either has to use the owner's operating system (OS) profile, create a new user OS profile, or sign in to the OS in a guest mode. However, each option has its own shortcomings. Using the owner's user OS profile may expose the owner's personal files and information to the guest user. Creating a new profile may expose the guest user's personal files and information to the owner. In addition, creating numerous profiles on a computer creates clutter on the device, both in terms of files and appearance on the OS login screen. Signing in to the OS in guest mode may provide the guest user with a sub-par experience, as the guest user's applications, extensions, bookmarks, windows, mouse settings, keyboard settings, language settings, and appearance settings may not be enabled on the owner's device.

The subject technology allows the guest user to enter account credentials when logging in to the OS as a guest. In some aspects, the account credentials are a username and password associated with an online user account, such as a social network account or an email account. The account credentials may be authenticated by an authentication server and the guest user's OS profile (e.g., the guest user's applications, extensions, bookmarks, windows, mouse settings, keyboard settings, language settings, and appearance settings) associated with the user account may be retrieved from a profile server.

The subject technology configures an operating system session using the guest user's OS profile. An operating system session may be the time period when the operating system of a client device is in use. The operating system session may begin when the user provides an indication to the client device to begin use. For example, the indication provided by the user may be the user's clicking on a "Login" button from a screen displayed to the user upon turning on the client device or activating the client device from a sleep or hibernation state. The operating system session may end when the user provides an indication to the client device to end use. For example, the indication provided by the user may be the user's clicking on a "Log out" or "Turn off" or "Shut down" button. Alternatively, an operating system session may not end until another user has begun another operating system session. For example, User A provides an indication to the client device to begin use. User A then provides an indication to the client device to end use. If User A is the next user to provide an indication to begin use, then this may be a continuation of User A's previous operating system session, and not a new operating system session. If User B is the next user to provide an indication to begin use, then User A's operating system session is terminated and the next user begins his/her operating system session.

Once the guest user terminates the operating system session, local data the guest user has accumulated on the owner's device during the session is removed. During the operating system session the guest user may create browser history, download files, or create files, and these data may be stored in a local temporary directory. In some aspects, the contents of the local temporary directory may be erased when the guest user logs out from the OS. In this way, the guest user is able to enjoy the benefits of having his/her settings applied to the owner's device, while also enjoying the benefit of an ephemeral experience, with no local data associated with the guest user remaining on the device.

Figure 1:
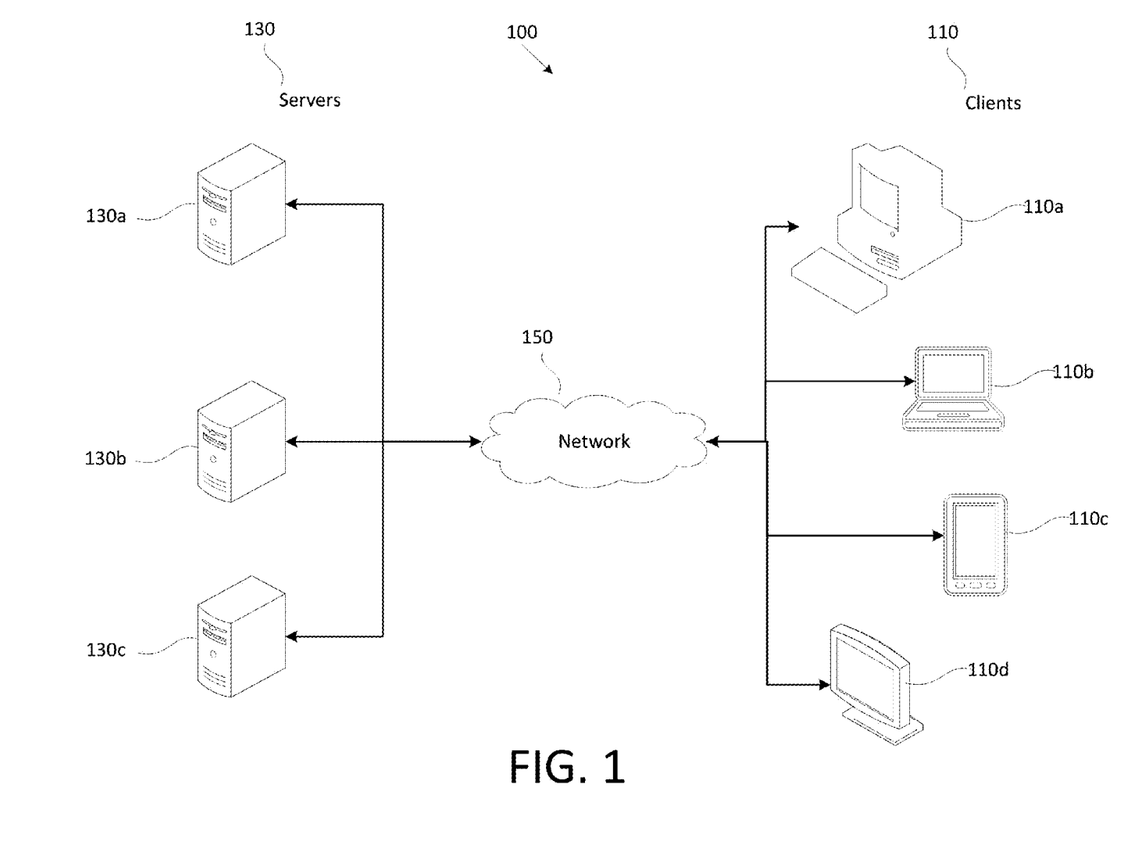
FIG. 1 illustrates a network environment in which the ephemeral user account system may be implemented.

FIG. 1 illustrates a network environment 100 in which the ephemeral user account system may be implemented. The environment 100 includes servers 130*a-c* and client devices 110*a-d* connected over a network 150. As an illustrative example, a user may own and regularly use a client device 110*a*. The user may also have access to a user account by presenting authentication credentials. A user OS profile associated with the user account may be used to configure an operating system session when the authentication credentials are provided to client device 110*a*. The authentication credentials may be verified by authentication server 130*a*. The user OS profile may be stored in profile server 130*b* and retrieved by client device 110*a* when authentication credentials are verified. The user, visiting a friend's house and using the friend's client device 110*b*, may use a guest login and provide authentication credentials associated with the user account. This authentication credentials are again verified by authentication server 130*a*. The user OS profile associated with the user account, stored on the profile server 130*b* and retrieved when the user is authenticated, is provided to the friend's client device 110*b*. An operating system session may be configured on the friend's client device 110*b* based on the retrieved user OS profile. When the user terminates the operating system session on the friend's client device 110*b*, the local data accumulated during the operating system session may be erased.

The client devices 110 can be, for example, desktop computers, mobile computers, tablet computers, mobile devices (e.g., a smartphone or PDA), set top boxes (e.g., for a television), video game consoles, or any other devices having processor, memory, and communications capabilities for configuring an operating system session based on a user OS profile. In some embodiments, a client device 110 may be a proxy server or other intermediary that makes connections and fetches resources on behalf of some other client device.

The servers 130 can be any device having a processor, memory, and communications capability for storing and sending a user OS profile. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The servers 130 may be an authentication server that is configured to authenticate account credentials. The servers 130 may be a content server that is configured to store content, such as images, videos, application files, and user OS profiles. A client device 110 that sends account credentials to an authentication server 130 may receive an indication that the account credentials are verified. Use of more than one server allows for load balancing between the servers.

Figure 2:
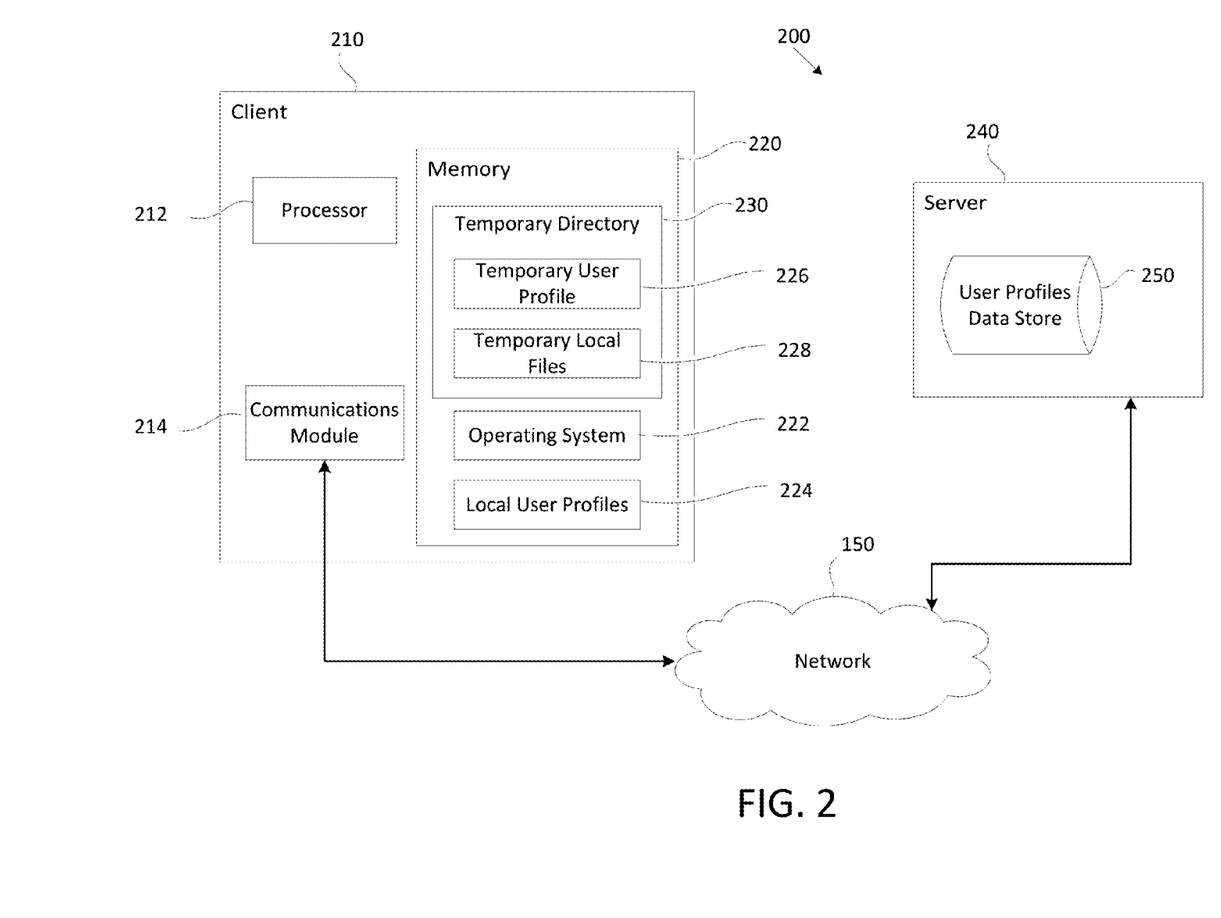
FIG. 2 is a block diagram illustrating an example client and server from the architecture of FIG. 1 according to certain aspects of the disclosure.

FIG. 2 is a block diagram 200 illustrating example client device 210 and server 240 in the architecture 100 of FIG. 1 according to certain aspects of the disclosure. The client device 210 and the server 240 are connected over the network 150.

The client device 210 includes a processor 212, a communications module 214, and a memory 220 that stores an operating system 222, local user profiles 224, and a temporary directory 230 storing a temporary guest user profile 226 and temporary local files 228. The processor 212 of the client device 210 is configured to execute instructions stored in memory 220.

The communications module 214 is configured to interface with the network 150 to send and receive information, such as data, requests, responses, and commands to other devices on the network. The communications module 214 can be, for example, a modem or an Ethernet card.

User OS profiles associated with one or more user accounts registered on the client device 210 are stored as local user profiles 224. For example, the owner of the client device 210 may provide user account credentials for a user account registered on the client device 210. The client device 210 may access a user OS profile stored as a local user profile 224 associated with the user account and configure an operating system session using the user OS profile. A user OS profile may include settings such as accessibility settings, appearance settings, or application settings.

The user OS profile may be one data file. Alternatively, the user OS profile may be multiple data files, with each data file containing a portion of the user OS profile. A link to a location may be provided where a data file containing the user OS profile may be retrieved. Alternatively, multiple links to multiple locations may be provided where data files containing portions of the user OS profile may be accessed. The user OS profile may be a data file containing a portion of the complete user OS profile and a link to a location where the rest of the user OS profile may be retrieved.

Accessibility settings are settings associated with input interfaces and input devices used to facilitate input to the client device 210 and output devices used to facilitate output from the client device 210. For example, accessibility settings may include user input settings such as mouse settings or keyboard settings. Accessibility settings may also include language settings, such as input language settings and default language used. Accessibility settings may also include peripheral device settings such as printer settings or speaker settings.

Appearance settings are settings associated with configuring what is displayed on the client device 210. For example, appearance settings may include background settings, such as an image file to be displayed as a background. Appearance settings may also include display settings, such as a display brightness level, a default font size, display color settings, orientation of the display (e.g., landscape or portrait), resolution, aspect ratio or frame rate. Appearance settings may also include settings associated with the way windows within the OS are presented, such as color scheme, or opacity of windows. Appearance settings may also include the layout of icons on the desktop, the layout of icons within OS menus, or the layout of OS toolbars.

Application settings are settings associated with applications accessed or run from the client device 210. For example, application settings may include which applications the user has access to. Applications may be locally installed applications which run from the device, or may be web applications run from a remote server and accessible over a network. Application settings may also include settings associated with the applications accessible to the user. For example, a web browser may be available to the user, and the application settings may include bookmarks and browsing history of the user. Application settings may also include application extensions or plugins.

Application settings may include the display of web applications to a user. Displaying a web application may include providing a link to a web resource associated with the web application. Application settings may include determining which web applications to display to the user, including display of icons associated with each web application. The application settings may also include the arrangement of the icons to be displayed to the user. In some aspects, the web applications may be arranged based on how frequently the user accesses the web application. In some aspects, the web applications may be arranged alphabetically. In some aspects, the web applications may be arranged based on when they were last accessed.

A client device 210 configuring an operating system session may have default settings used to configure the operating system session. The client device 210 may use settings specified in the user OS profile in lieu of the default settings, if a setting is specified in the user OS profile. For example, a client device 210 may have a default language of English. However, a user OS profile may have an accessibility setting of language as German. The client device 210, in configuring the operating system session, may use the language setting of German specified in the user OS profile instead of the default setting of English.

The temporary directory 230 stores the temporary user profile 226 and the temporary local files 228. The temporary directory 230 may not be accessible to other users of the client device 210. The contents of memory 220 other than the temporary user profile 226 and temporary local files 228 may not be accessible to the guest user.

A client device 210 may send account credentials associated with a guest user account and receive a user OS profile associated with the guest user account. The received user OS profile associated with the guest user account may be stored as the temporary user profile 226.

Temporary local files 228 may be files accumulated during a guest operating system session. The temporary local files 228 may include files downloaded during the guest operating system session or files created during the guest operating system session. The temporary local files 228 may also include browser history accumulated during the guest operating system session. Upon termination of an operating system session configured using the temporary user profile 226 received from the server 240, the contents of the temporary directory 230 may be erased.

The server 240 is accessible over the network 150 and stores user OS profiles associated with user accounts in a user profiles data store 250. The user OS profiles may contain user settings, as discussed above. The user profiles data store 250 may index the user OS profiles by user account. As discussed above, the user account may be associated with an online user account, such as an email account, a social network account, or any account associated with user account credentials.

Figure 3:
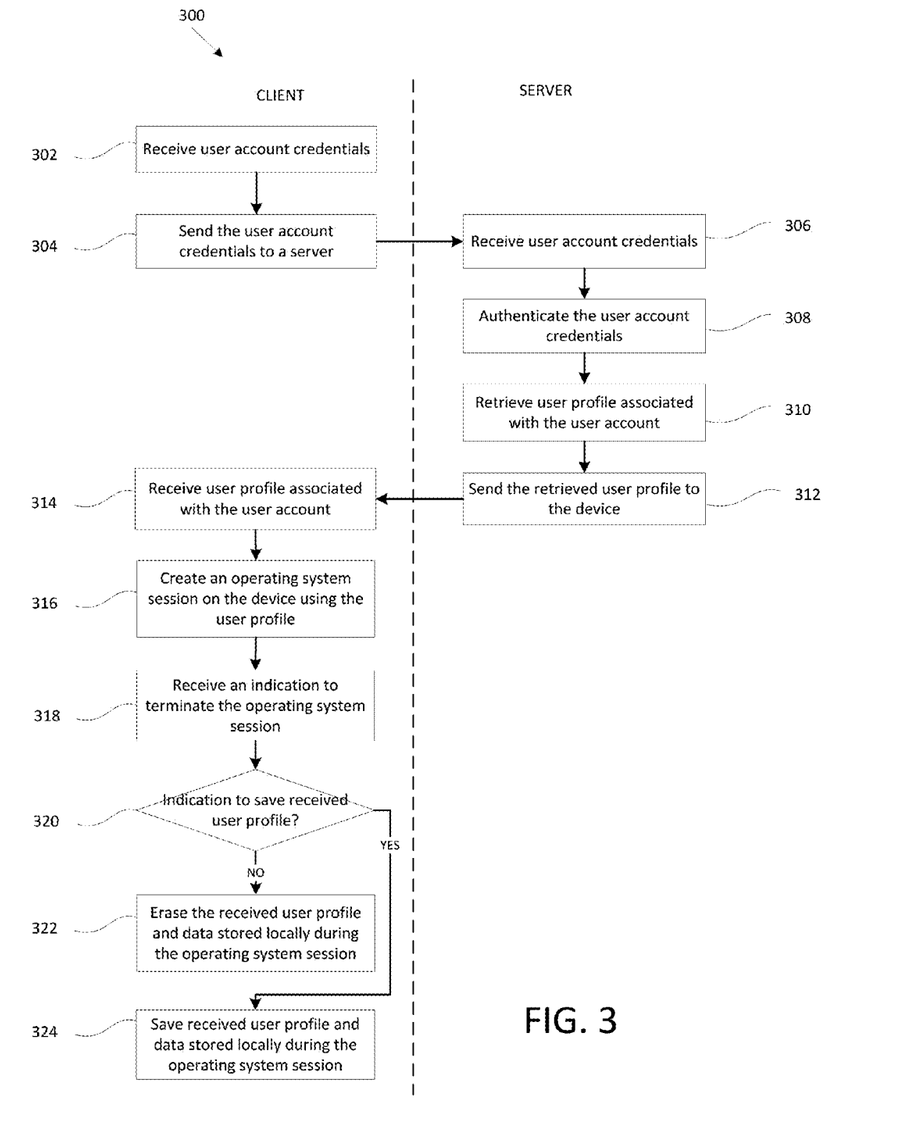
FIG. 3 illustrates an example process for an ephemeral user account system using the example client of FIG. 2.

FIG. 3 illustrates an example process 300 for an ephemeral user account system using, for example, client device 210, network 150, and server 240 of FIG. 2. While FIG. 3 is described with reference to FIG. 2, FIG. 4A, and FIG. 4B, it should be noted that the process blocks of FIG. 3 may be performed by other systems.

A user may turn on the client device 210 or activate the client device 210 from a sleep or hibernation state. Upon turning on the client device 210 or activating the client device 210, the user may be presented with icons representing profiles associated with the client device 210, such as an icon 402 associated with Jim's profile and an icon 404 associated with Hana's profile shown in FIG. 4A and FIG. 4B. If the user selects one of these icons 402, 404, the user may be prompted to enter in account credentials, such as a password. Once the account credentials are authenticated, an operating system session is configured according to the user OS profile associated with the entered account credentials.

Figure 4A:
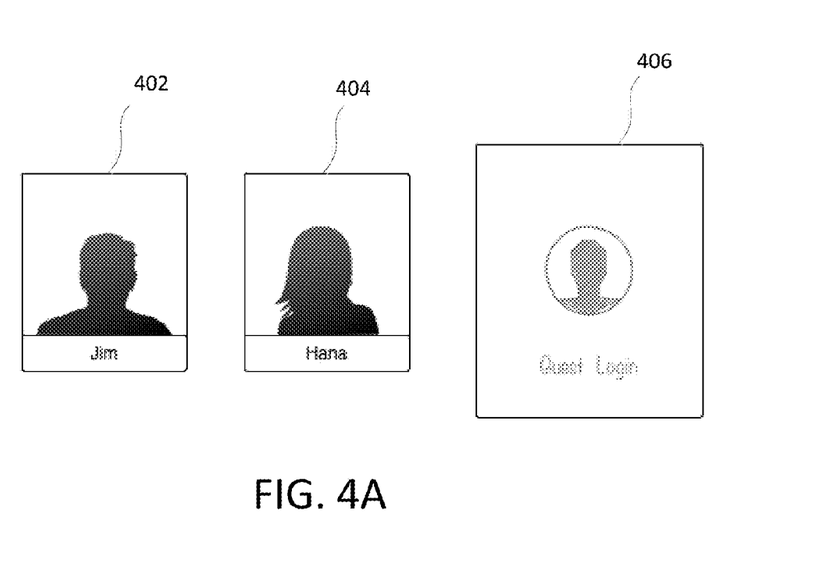
FIG. 4A illustrates an example interface for an ephemeral user account system using the example client of FIG. 2.
Figure 4B:
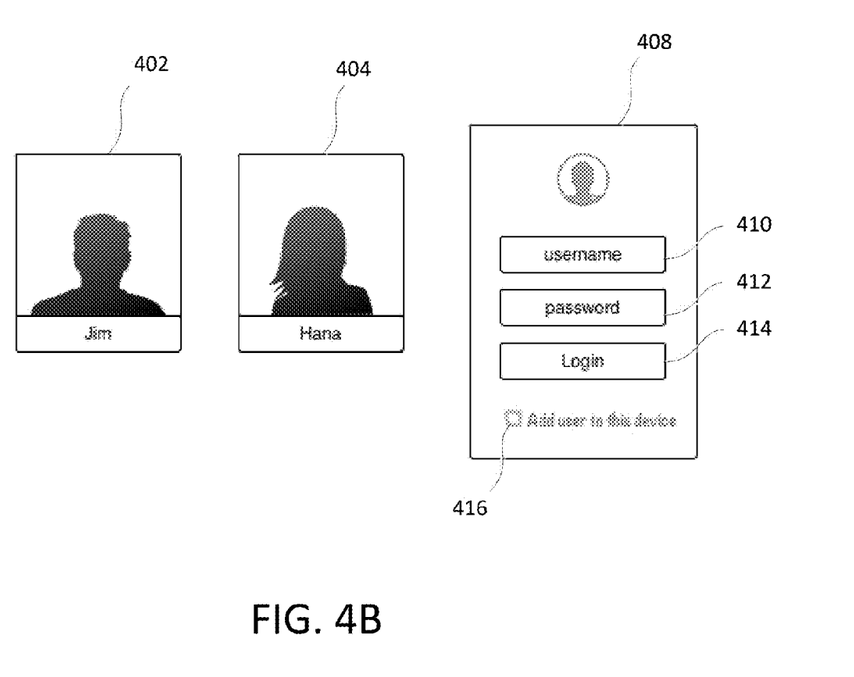
FIG. 4B illustrates an example interface for an ephemeral user account system using the example client of FIG. 2.

Upon turning on the client device 210 or activating the client device 210, the user may also be presented with an icon 406 associated with a default guest profile. Upon selecting the icon 406 associated with the guest profile, an operating system session is configured using a default guest user OS profile. The default guest user OS profile may contain settings independent of the guest user's preferences, and the settings may be set by the owner of the client device 210. The guest user may prefer using a default guest user OS profile because configuring an operating system session using the default guest user OS profile may be faster than configuring an operating system session using an obtained user OS profile. The guest user may also prefer using a default guest user OS profile if the guest user is not comfortable in potentially exposing his/her user OS profile to other users by receiving it onto the client device 210.

Alternatively, upon turning on the client device 210 or activating the client device 210, the guest user may be presented with an interface 408. The interface 408 contains a username field 410, password field 412, and login button 414. Instead of using the default guest user OS profile, the guest user may provide account credentials, such as a username and password, which may be entered into the username field 410 and password field 412, respectively.

The owner of the client device 210 may determine whether the icon 406 associated with a default guest profile is presented or the interface 408 is presented upon turning on the client device 210 or activating the client device 210. This may be done by configuring settings associated with the client device 210. If the owner of the client device 210 configures the client device 210 to display icon 406, a guest user's user OS profile will not be received. If the owner of the client device 210 configures the client device 210 to display interface 408, the guest user's user OS profile may be received.

Even if the owner configures the client device 210 to display interface 408, it may still be possible for the guest user to use the default guest user OS profile. The guest user may leave the username field 410 and password field 412 blank and click the login button 414, for example. The client device 210, recognizing no account credentials being entered, may configure an operating system session using the default guest user OS profile. Alternatively, the guest user may enter incorrect account credentials into the username field 410 or password field 412 and click the login button 414. The client device 210 may receive an indication from the server 240 that the account credentials could not be verified.

The client device 210 may notify the guest user that the account credentials entered could not be verified and may provide an option to apply the default guest user OS profile. If the guest user indicates he/she would like to apply the default guest user OS profile, an operating system session is configured using the default guest user OS profile. Alternatively, if an indication that the account credentials could not be verified is received from the server 240, the client device 210 may not provide an option to the guest user to apply the default guest user OS profile and the client device 210 may simply configure the operating system session using the default guest user OS profile.

A save checkbox 416 may be displayed in interface 408. If save checkbox 416 is selected, a user OS profile received from the server 240 is added to the device. The owner of the client device 210 may determine whether save checkbox 416 should be available to the guest user by configuring settings associated with the client device 210. If the owner determines the save checkbox should not be available to the guest user, the save checkbox 416 may be disabled or not shown.

If interface 408 is displayed to the guest user and the guest user has entered in the account credentials (302), the login button 414 is clicked. Upon clicking of the login button 414, the client device 210 sends the user account credentials to the server (304). The user account credentials may be associated with an online user account, such as a social network account or an email account. When a retrieved guest user OS profile is used, the guest user does not have access to the files associated with other user OS profiles stored on the client device 210.

The server 240 receives the user account credentials from the client device 210 (306). The client device 210 may send, and the server 240 may receive, the user account credentials using any network protocol, such as TCP/IP. The transmission of the user account credentials may be sent without encryption, or the transmission may be encrypted in order to protect privacy and ensure confidentiality if the transmission is intercepted.

The server 240 authenticates the user account credentials (308). The server 240 may send the user account credentials to a third-party authentication server and receive a response indicating whether the user account credentials are authenticated. Authenticating the user account credentials allows the server 240 to verify the user is allowed access to a user OS profile associated with the user account.

The server 240 retrieves a user OS profile associated with the user account from the user profile data store 250 (310). The user OS profiles may be indexed in the user profiles data store 250 by user account. As discussed above, a user OS profile may be a data file, multiple data files, a link, multiple links, or a combination of data files and links.

The server 240 sends the retrieved user OS profile to the client device 210 (312). As discussed above, any network protocol may be used to send the retrieved user OS profile, and the transmission may or may not be encrypted. The client device 210 receives the user OS profile associated with the user account (314). The client device 210 may store the contents of the received user OS profile as the temporary user profile 226.

The client device 210 configures an operating system session on the client device 210 using the retrieved user OS profile (316). The user OS profile may contain user settings and files or a link to where user settings and files may be accessed. For example, if user settings comprised display settings and an image file to be used as the background, the user OS profile may contain the actual data representing the display settings as well as a link to a location where the image file to be used as the background may be retrieved.

Files may be created or downloaded during the operating system session. The files that are created or downloaded may be stored as temporary local files 228. In addition, during the operating system session, the guest user may make changes to his/her settings. For example, the guest user may add bookmarks and create additional browser history during the operating system session. Any changes or updates made to the user OS profile may be sent to the server 240 in order to update the user OS profile saved in user profiles data store 250.

After the user is done using the client device 210, the client device 210 receives an indication to terminate the operating system session (318). The indication to terminate the operating system session may be the user selecting "Log Out" or "Shut Down" or an equivalent indication from the operating system menu. In some aspects, a confirmation message or a warning are displayed, indicating that terminating the operating system session will result in the erasure of locally saved data associated with the operating system session.

An additional indication may be received to save, instead of erase, the guest profile (320). Saving the guest profile may mean saving the locally saved data during the operating system session and the data associated with the user settings to non-volatile memory (324). When the additional indication to save the data is received, the data stored as the temporary user profile 226 may be stored as local user profiles 224. Further, when the indication to save the data is received, the data stored as the temporary local files 228 is stored as non-temporary local files in memory 220.

As part of the configurable settings associated with the client device 210 discussed above, the owner of the client device 210 may determine whether the guest user is able to give the additional indication to save the guest profile. If the owner of the client device 210 disables saving the guest profile, the guest user is unable to give the additional indication to save the guest profile.

If an additional indication to save the guest profile is not received, the client device 210 erases local data associated with the operating system session (322). Data stored in the temporary directory 230, such as the temporary user profile 226 and temporary local files 228, may be erased. As discussed above, the temporary local files 228 may contain browser history generated during the operating system session, files downloaded during the operating system session, or files created during the operating system session. A record of which user OS profiles were accessed may be maintained on the client device 210. A record of the guest user accessing his/her profile using the client device 210 may be erased.

When the local data associated with the operating system session is erased, there may be no record remaining that a guest user used the client device. There may be no icon representing a previously used and erased guest user OS profile that is presented to a user upon turning on the client device or activating it from a sleep or hibernation state. User OS profiles saved to the client device in local user profiles 224 may be presented to the user upon turning on the client device or activating it from a sleep or hibernation state.

FIG. 3 sets forth an example process 300 for an ephemeral user account system using the example client device 210, network 150, and server 240 of FIG. 2 and icons 402, 404, and 406 and interface 408 of FIG. 4A and FIG. 4B. An example will now be described using the example process 300 of FIG. 3, a client device 210 that is a laptop, and the icons and interface of FIG. 4A and FIG. 4B.

A user named Foo Bar is visiting Jim's house and Foo may need to borrow Jim's computer. Foo turns on Jim's laptop 210 and is presented with a screen including the icons shown in FIG. 4A. Foo does not want to ask Jim for Jim's password, as Jim may be reluctant to allow Foo access to all of his documents. Foo does not want to create a new account on Jim's laptop 210, as Foo may never have to log in again on Jim's laptop 210 in the future. Therefore, Foo selects the icon associated with a guest account 406. Foo then enters in his account credentials, "foobar" and "HelloWorld" into the username field 410 and password field 412, respectively. Foo clicks Login 414. The laptop 210 receives Foo's user account credentials (302).

Foo's username and password are sent by the laptop 210 to the server 240 (302). Foo's username and password are received by the server 240 (304). Foo's username and password are authenticated (306). As described above, Foo's username and password may be authenticated by a third party server or may be authenticated using a data store associated with server 240.

Once Foo's username and password are authenticated, the server 240 retrieves Foo's OS profile (310). As described above, Foo's retrieved user OS profile may contain user settings and files. For example, Foo's user OS profile contains: a background picture (background.jpg), Foo's mouse settings (sensitivity level 8), and Foo's language settings (English—UK).

The server 240 sends Foo's retrieved user OS profile to the laptop 210 (312). The laptop 210 receives Foo's retrieved user OS profile (314). The laptop 210 configures an operating system session on the laptop 210 using Foo's profile (316). The background picture is set to background.jpg, the mouse sensitivity is set to level 8, and the language is set to English—UK. In this example, mouse sensitivity is a universal setting and language is a non-universal setting.

During the operating system session, Foo may create a document (paper.doc) and download a song (BestBand-CoolSong.mp3). In this example, paper.doc and BestBand-CoolSong.mp3 are saved as temporary local files 228.

After Foo is done using the laptop 210, Foo may instruct the laptop 210 to shut down, resulting in a termination of the operating system session (318). Foo does not give an indication to save the profile and files (320).

The laptop 210 erases local data associated with the operating system session (322). The temporary local files 228, which include paper.doc and BestBand-CoolSong.mp3, are erased. In addition, the temporary user profile 226 is also erased. As mouse sensitivity, in this example, is a universal setting, it is reverted to the previous sensitivity level.

Figure 5:
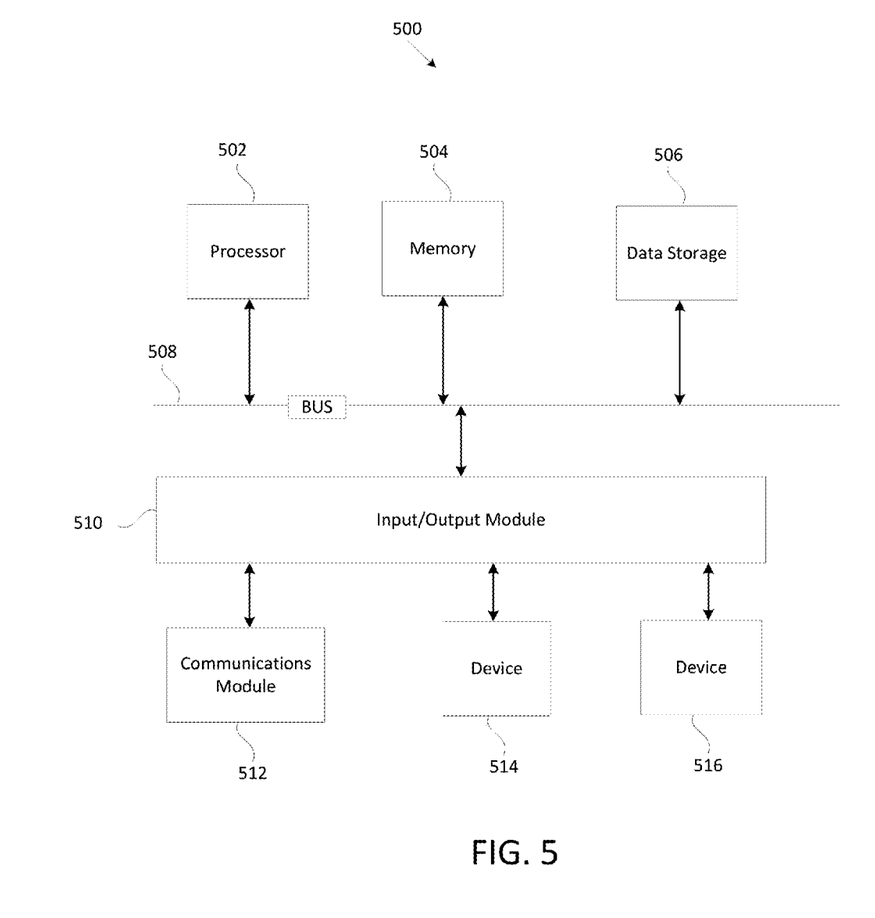
FIG. 5 is a block diagram illustrating an example computer system with which some implementations of the subject technology can be implemented.

FIG. 5 is a block diagram illustrating an example computer system 500 with which some implementations of the subject technology can be implemented. In certain aspects, the computer system 500 may be implemented using hardware or a combination of software and hardware, either in a dedicated server, or integrated into another entity, or distributed across multiple entities.

Computer system 500 (e.g., client devices 110 and servers 130) includes a bus 508 or other communication mechanism for communicating information, and a processor 502 (e.g., processor 212) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 214) include networking interface cards, such as Ethernet cards and modems. In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), or LCD (liquid crystal display) screen, for displaying information to the user.

According to one aspect of the present disclosure, the client device 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network.

Computing system 500 can include client devices and servers. A client device and server are generally remote from each other and typically interact through a communication network. The relationship of client device and server arises by virtue of computer programs running on the respective computers and having a client-server relationship to each other.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. To the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A non-transitory machine-readable medium embodying instructions that, when executed by a machine, allow the machine to perform a method comprising:
   receiving, at a computing device, user account credentials associated with an online user account;
   sending the user account credentials to a server;
   receiving, in response to sending the user account credentials to a server, a user profile associated with the user account;
   configuring an operating system session on the device based on the user profile;
   receiving an indication to terminate the operating system session;
   determining whether to save or erase the received user profile based on a configurable setting associated with the computing device; and
   erasing, upon termination of the operating system session and based on the configurable setting, the received user profile and data stored locally on the computing device during the operating system session.

2. The non-transitory machine-readable medium of claim 1, wherein the method further comprises creating a local temporary directory associated with the operating system session,
   wherein the data stored locally on the computing device during the operating system session is stored in the local temporary directory, and
   wherein erasing the data stored locally on the computing device comprises erasing the data stored in the local temporary directory.

3. The non-transitory machine-readable medium of claim 1, wherein the method further comprises:
   creating a local temporary directory associated with the operating system session; and
   storing the received user profile in the local temporary directory,
   wherein erasing the user profile comprises erasing the data stored in the local temporary directory.

4. The non-transitory machine-readable medium of claim 1, wherein the method further comprises:
   receiving an indication to save the received user profile; and
   saving, upon termination of the operating system session and in response to the received indication, the received user profile on the computing device.

5. The non-transitory machine-readable medium of claim 4, wherein saving the user profile on the computing device comprises moving the received user profile from a local temporary directory to a local user profile.

6. The non-transitory machine-readable medium of claim 1, wherein the method further comprises sending, from the computing device to the server, modifications to the received user profile made during the operating system session.

7. The non-transitory machine-readable medium of claim 1, wherein the user profile comprises at least one of: appearance settings, accessibility settings, or application settings.

8. A client system comprising:
   a memory storing executable instructions; and
   a processor configured to execute the executable instructions stored in the memory to:
      receive, at a computing device, user account credentials associated with an online user account;
      send the user account credentials to a server;
      receive, in response to sending the user account credentials to a server, a user operating system profile associated with the user account, wherein the user operating system profile comprises user settings associated with an operating system;
      configure an operating system session on the device based on the user profile;
      receive an indication to terminate the operating system session;

determine whether to save or erase the received user profile based on a configurable setting associated with the computing device; and erase, upon termination of the operating system session and based on the configurable setting, the received user profile and data stored locally on the computing device during the operating system session.

9. The client system of claim 8, wherein the processor is further configured to create a local temporary directory associated with the operating system session, wherein the data stored locally on the computing device during the operating system session is stored in the local temporary directory, and wherein erasing the data stored locally on the computing device comprises erasing the data stored in the local temporary directory.

10. The client system of claim 8, wherein the processor is further configured to:

create a local temporary directory associated with the operating system session; and store the received user profile in the local temporary directory, wherein erasing the user profile comprises erasing the data stored in the local temporary directory.

11. The client system of claim 8, wherein the processor is further configured to:

receive an indication to save the received user profile; and save, upon termination of the operating system session and in response to the received indication, the received user profile on the computing device.

12. The client system of claim 11, wherein saving the user profile on the computing device comprises moving the received user profile from a local temporary directory to a local user profile.

13. The client system of claim 8, wherein the processor is further configured to send, from the computing device to the server, modifications to the received user profile made during the operating system session.

14. The client system of claim 8, wherein the user profile comprises at least one of: appearance settings, accessibility settings, or application settings.

15. A computer-implemented method comprising:

receiving, at a computing device, via a device login interface, user account credentials associated with an online user account;

sending the user account credentials to a server;

receiving, in response to sending the user account credentials to a server, a user profile associated with the user account;

configuring an operating system session on the device, based on the user profile;

receiving an indication to terminate the operating system session;

determining whether to save or erase the received user profile based on a configurable setting associated with the computing device; and erasing, upon termination of the operating system session and based on the configurable setting, the received user profile and data stored locally on the computing device during the operating system session.

16. The method of claim 15, further comprising creating a local temporary directory associated with the operating system session, wherein the data stored locally on the computing device during the operating system session is stored in the local temporary directory, and wherein erasing the data stored locally on the computing device comprises erasing the data stored in the local temporary directory.

17. The method of claim 15, further comprising:

creating a local temporary directory associated with the operating system session; and storing the received user profile in the local temporary directory, wherein erasing the user profile comprises erasing the data stored in the local temporary directory.

18. The method of claim 15, further comprising:

receiving an indication to save the received user profile; and saving, upon termination of the operating system session and in response to the received indication, the received user profile on the computing device.

19. The method of claim 18, wherein saving the user profile on the computing device comprises moving the received user profile from a local temporary directory to a local user profile.

20. The method of claim 15, further comprising sending, from the computing device to the server, modifications to the received user profile made during the operating system session.

21. The non-transitory machine-readable medium of claim 4, wherein receiving the indication to save the received user profile is enabled based on the configurable setting.

* * * * *